United States Patent [19]
Durand

[11] 3,980,163
[45] Sept. 14, 1976

[54] WINCH FOR CABLE CAR
[76] Inventor: François Durand, 11 rue du Bateau, 06600 Antibes, France
[22] Filed: Dec. 26, 1973
[21] Appl. No.: 427,697

[52] U.S. Cl. .................................. 192/7; 74/410
[51] Int. Cl.[2] .................. B60T 7/12; F16H 57/00
[58] Field of Search ............... 254/195, 191, 190 R, 254/192, 194, 150 R, 186 R, 171, 174, 187 C; 74/461, 805, 410, 411; 192/8 R, 7, 150; 188/180 R

[56] References Cited
UNITED STATES PATENTS

| | | | |
|---|---|---|---|
| 3,175,110 | 3/1965 | Kohlhagen | 74/461 |
| 3,336,814 | 8/1967 | Holzer | 74/461 |
| 3,602,482 | 8/1971 | Guinot | 254/150 R |
| 3,627,087 | 12/1971 | Eskridge | 254/150 R |
| 3,754,616 | 8/1973 | Watland | 74/461 |

*Primary Examiner*—Robert J. Spar
*Assistant Examiner*—Kenneth Noland
*Attorney, Agent, or Firm*—Wood, Herron & Evans

[57] ABSTRACT

A cable car winch comprising a housing, a pulley, a main gear, a pinion and a primary gear reduction unit including a pinion for driving the main gear. The winch is characterized by the fact that a hub turns around a spindle which is rigidly affixed to the housing, and that the main gear is attached to the hub. The pinion and the primary reducer form a self-aligning block with relation to the main gear and are linked to the housing by means of connecting links and articulated swing bars.

9 Claims, 3 Drawing Figures

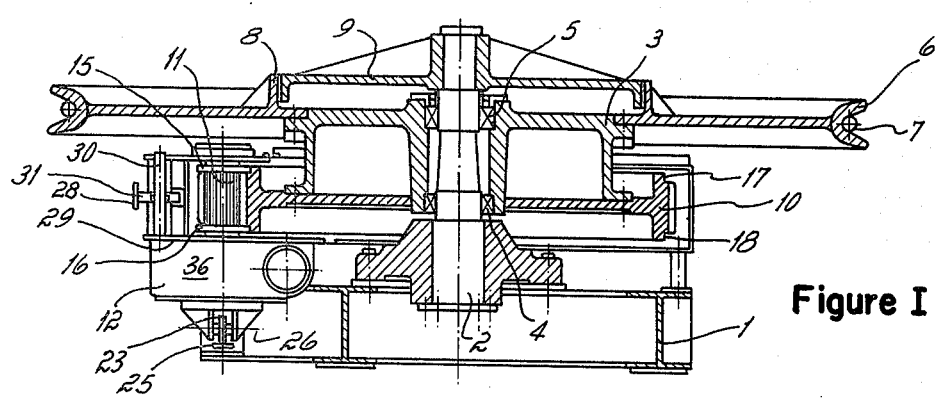
Figure I
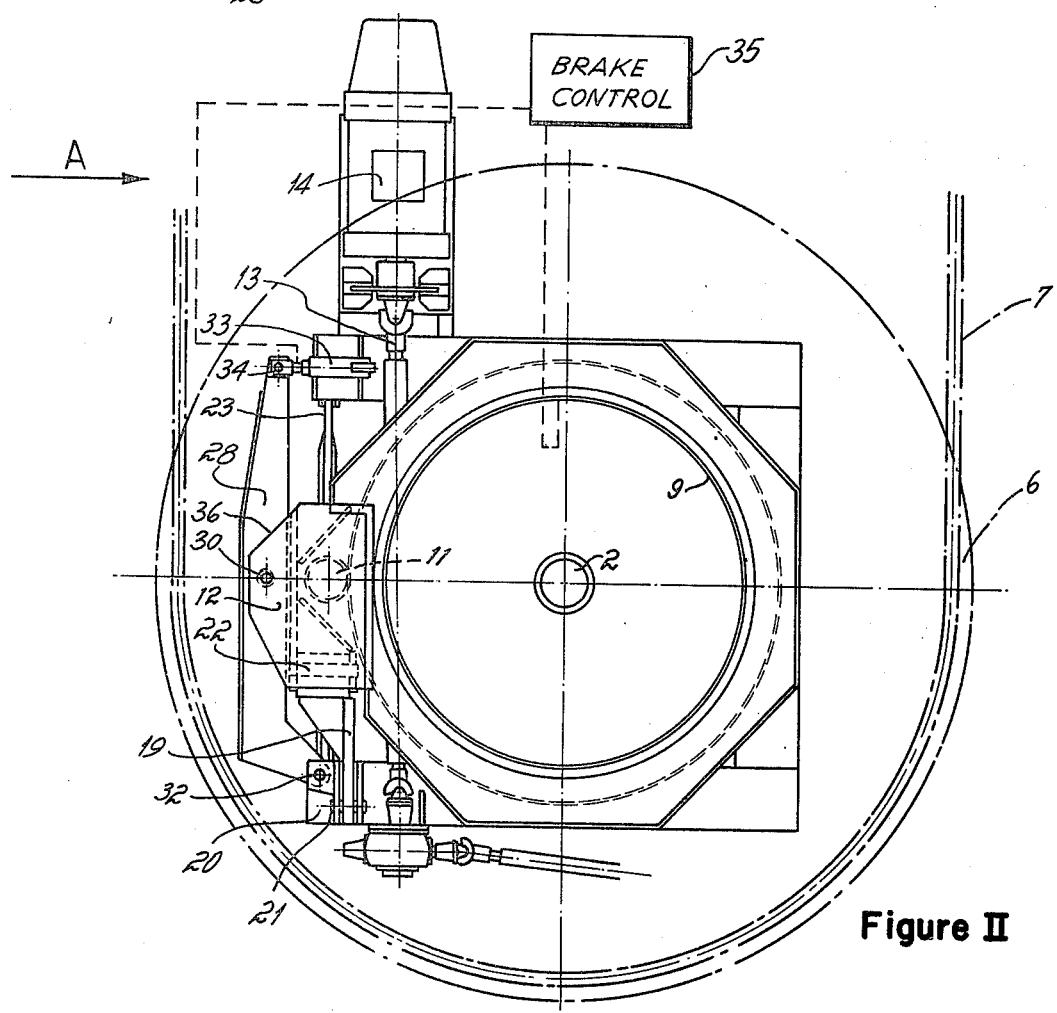
Figure II
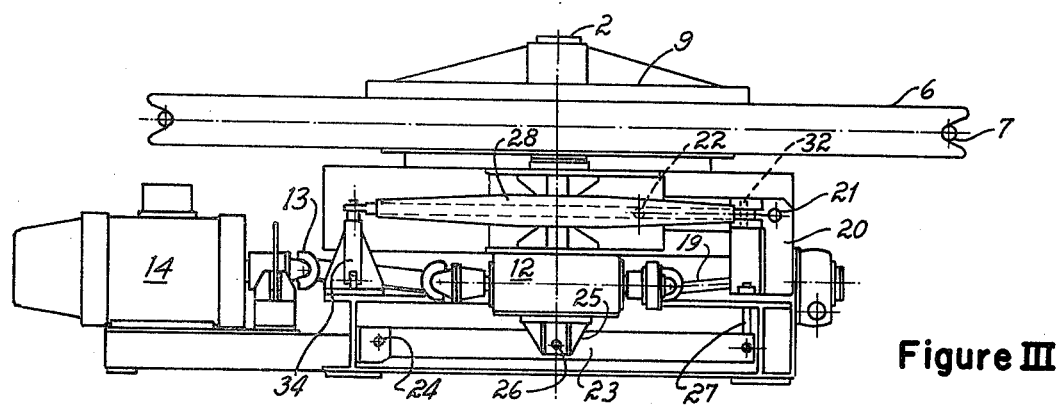
Figure III

WINCH FOR CABLE CAR

Winches for cable cars are generally employed and emplaced in mountainous environments which are not accessible to the commonly used maintenance units.

These winches should be light in weight and occupy little space. They should also meet all the required safety standards and be able to be disassembled and rebuilt with minimum effort.

The pulley should be exchangeable, so as to prevent accidents caused by the wear of the groove due to the constant friction of the cable.

Further, the cable car winches previously known to the art have generally made use of a pinion gear fixed in place relative to, and interengaged with, a fixed drive gear. That is, the pinion gear is positioned on a first fixed axis and the drive gear is positioned on a second fixed axis. This causes uneven loading of the gear teeth under certain operational conditions such as when same are exposed to high load forces; such high load forces might cause flexing of the main gear's centerpost shaft or even limited axial movement of the main gear along its centerpost shaft. Such distortion within the gearing causes uneven loading of the gear teeth which, in turn, tends to break the gear teeth. Thus, another objective of this invention has been to provide a pinion gear mounting structure within a cable car winch structural environment that permits optimum tooth contact between the pinion gear and the main gear regardless of the distortion of the gearing brought about by operating condition forces.

The winch described in the present invention meets the objectives enumerated above. It consists of a hub which turns around a spindle or shaft which is rigidly riveted to a relatively lightweight housing which is affixed to the ground. The pulley is attached to the hub in the manner of a steering wheel of a car and therefore it may be easily disassembled.

The main gear is also attached rigidly to the hub. A pinion, which is part of the primary reducer, meshes with the main gear. This pinion and the primary reducer form a relatively light assembly which may be easily mounted and adjusted on the winch. The meshing of the pinion teeth with those of the drive gear is automatically maintained constant, notwithstanding the eventual deformation of the housing due to the stresses to which the winch is subjected. The only controllable adjustments are those that regulate the distance between the centers of the pinion and the drive gear; these may be negligible in the case of involute gear teeth. For this purpose the pinion block of the primary reducer is linked to the housing of the winch by means of connecting rods and swing bars. These are simple and very light pieces, easy to mount and they allow for the automatic self-alignment of the pinion in order to assure a total contact of its teeth with those of the main gear.

The primary reducer is linked to the motor by means of a universal joint. Rollers which are concentric with the pinion and located at either side of the drive gear serve to facilitate the adjustment of the connecting rods that position the assembly pinion-primary reducer in relation to the main gear.

These rollers move on tracks located on the periphery of the main gear and at either side of it.

One of the connecting rods which links the swing bar that controls the distance between the centers of the pinion and the gear may be telescopic and provided with a movable stop and with a pre-compressed spring. The pre-compression of the spring is a function of the maximum reactive forces developed by the engagement of the toothings of the gear and the pinion.

In cases of abnormal operation, in which these engagement forces may reach very high values, the spring will deform and consequently the length of the telescopic connecting rod will change. This effect will then be transferred by means of a servo-mechanism which will stop the motor and activate the safety brake which is generally located at the side of the pulley.

As an example, the FIGS. I and II and III represent a winch according to the present invention.

FIG. I is a cross section through the pulley, the gear and the pinion.

FIG. II is a top view of the assembled winch.

FIG. III constitutes a view "A" of the FIG. II.

The housing 1 holds the spindle 2 around which turns the hub 3 which is supported by the bearings 4 and 5. The pulley 6 to which the cable 7 is secured, is rigidly attached to the hub 3. The drum 8 which is affixed to the pulley 6, serves as support for the brake 9, which is affixed to the spindle 2. The main gear 10 which is also rigidly attached to the hub 3 engages with the pinion 11 of the primary reducer 12, which in turn meshes with a worm gear.

On the example depicted in the figures, the universal joint 13 links the high speed shaft of the reducer 12 with the motor 14. The rollers 15 and 16 which are concentric with the pinion 11 move along the tracks 17 and 18 of the main gear.

The connecting bar 19 absorbs the tangential forces developed by the meshing gears and is linked to the housing of the winch by the plate 20 and by the shaft 21, and to the pinion of the primary reducer by means of the perpendicular axle 22. The plane determined by the axles 21 and 22 is located on the median plane formed by the teeth of the main gear and those of the pinion.

The swing bar 23, which is linked to the primary reducer by means of the plate 25 and the axle 26 and attached to one side of the housing 1 by means of the axle 24 and at the other side by the swell rod 27, acts as a regulator in the vertical direction of the position of the pinion 11 in relation to the main gear 10, by displacing itself along the rod 27.

The swing bar 28 is linked to the reducer 12 at a point which belongs to the plane determined by the teeth of the pinion 11 and of the main gear 10, by means of the plate 29 and the axle 30. A pin 31 which may be placed between the axle 30 and the swing bar 28 is linked at one side of the housing 1 by means of the axle 32 and to the other side by the small connecting rod 33, whose length regulates the distance between the centers of the pinion 11 and the main gear 10. This swell connecting rod may be telescopic and it is provided with a movable stop and a pre-compressed spring.

Any force that is greater than the pre-compression tension will cause the length of the connecting rod to vary and in this manner influence the servo-command mechanism 35 which controls the abnormal loads by stopping the motor and releasing the safety brake 9.

A connecting bar 34 may be placed between the swing bar 28 and the housing 1. The purpose of this connecting bar is to absorb partially or totally the input drive moment. This job may also be performed by the rollers 15 and 16 as they slide along the tracks 17 and 18.

I claim:

1. A winch comprising
a pulley having a main gear fixed thereto,
a pinion operatively engaged with said main gear, said pinion being carried in a mounting block,
a first swing bar pivotally connected at one end to ground, said pinion mounting block being pivotally connected to said first swing bar intermediate the ends thereof,
an elastic connecting rod connected at one end to the other end of said first swing bar and to ground at the other end, said elastic connecting rod including a compression device adapted continuously to bias said first swing bar about its pivot connection with ground, thereby continuously biasing said pinion toward meshed engagement with said main gear, and
a brake control servo-command mechanism connected between said elastic connecting rod and said main gear, said brake mechanism being activated to brake said main gear when the forces developed between said pinion gear and said main gear are such as to effect an increase in the length of said elastic connecting rod.

2. A winch as set forth in claim 1 including
a brake drum surface also fixed to said pulley, and
a drum brake juxtaposed to said brake drum surface, said brake control servo-command mechanism being connected with said drum brake.

3. A winch as set forth in claim 1 including
a second swing bar pivotally mounted to ground at one end, said pinion mounting block being pivotally connected to said second swing bar intermediate the ends thereof, and
a swell device connecting the other end of said second swing bar with ground, said swell device permitting limited pivotal motion of said second swing bar, thereby permitting limited motion of said pinion gear along its axis relative to said main gear.

4. A winch as set forth in claim 3 wherein the plane of said main gear and pinion is substantially horizontal, the pivot motion plane of said first swing bar is substantially horizontal, and the pivot motion plane of said second swing bar is substantially vertical.

5. A winch comprising
a pulley having a main gear fixed thereto,
a pinion operatively engaged with said main gear, said pinion being carried by a mounting block,
a first swing bar pivotally connected at one end to ground, said pinion mounting block being pivotally connected to said first swing bar intermediate the ends thereof,
an elastic connecting rod connected at one end to the other end of said first swing bar and to ground at the other end, said elastic connecting rod including a compression device adapted continuously to bias said first swing bar about its pivot connection with ground, thereby continuously biasing said pinion toward meshed engagement with said main gear,
a second swing bar pivotally mounted to ground at one end, said pinion mounting block being pivotally connected to said second swing bar intermediate the ends thereof, and
a swell device connecting the other end of said second swing bar with ground, said swell device permitting limited pivotal motion of said second swing bar, thereby permitting limited motion of said pinion gear along its axis relative to said main gear.

6. A winch as set forth in claim 5 wherein the plane of said main gear and pinion is substantially horizontal, the pivot motion plane of said first swing bar is substantially horizontal, and the pivot motion plane of said second swing bar is substantially vertical.

7. A winch as set forth in claim 5 including
a connecting force bar pivotally connected to ground at one end and pivotally connected to said mounting block at the other end, said bar being thereby adapted to absorb tangential forces developed by said pinion and main gear, and said bar being located in the median plane of said pinion under normal conditions.

8. A winch as set forth in claim 5 including
a primary reducer connected with said pinion, said primary reducer also being carried by said pinion mounting block.

9. A winch as set forth in claim 5 wherein said main gear is an external toothed gear.

* * * * *